United States Patent
Dash et al.

(10) Patent No.: US 11,542,204 B2
(45) Date of Patent: Jan. 3, 2023

(54) METHOD FOR PRODUCING NON-OXIDE CERAMIC POWDERS

(71) Applicant: FORSCHUNGSZENTRUM JUELICH GmbH, Juelich (DE)

(72) Inventors: Apurv Dash, Juelich (DE); Jesus Gonzalez, Aachen (DE); Robert Vassen, Herzogenrath (DE); Olivier Guillon, Juelich (DE)

(73) Assignee: FORSCHUNGSZENTRUM JUELICH GMBH, Juelich (DE)

( * ) Notice: Subject to any disclaimer, the term of this patent is extended or adjusted under 35 U.S.C. 154(b) by 598 days.

(21) Appl. No.: 16/622,312

(22) PCT Filed: Jun. 7, 2018

(86) PCT No.: PCT/DE2018/000178
§ 371 (c)(1),
(2) Date: Dec. 13, 2019

(87) PCT Pub. No.: WO2019/011358
PCT Pub. Date: Jan. 17, 2019

(65) Prior Publication Data
US 2021/0147301 A1 May 20, 2021

(30) Foreign Application Priority Data
Jul. 13, 2017 (DE) .................... 10 2017 006 658.2

(51) Int. Cl.
*C04B 35/626* (2006.01)
*C04B 35/56* (2006.01)

(52) U.S. Cl.
CPC .... *C04B 35/62695* (2013.01); *C04B 35/5615* (2013.01); *C04B 35/5618* (2013.01);
(Continued)

(58) Field of Classification Search
CPC .......... C04B 35/62695; C04B 35/5615; C04B 35/5618; C04B 35/6261; C04B 35/62645;
(Continued)

(56) References Cited

U.S. PATENT DOCUMENTS

2011/0052925 A1 3/2011 Sarrafi-Nour et al.
2016/0265367 A1 9/2016 Rosenzweig et al.

FOREIGN PATENT DOCUMENTS

CN 1511803 A 7/2004
CN 1511807 A 7/2004
(Continued)

OTHER PUBLICATIONS

Guo et al (Preparation of Ti3SiC2 powders by the molten salt method, Materials Letters, 2013) (Year: 2013).*
(Continued)

*Primary Examiner* — Anthony J Zimmer
*Assistant Examiner* — Logan Edward Laclair
(74) *Attorney, Agent, or Firm* — Leydig, Voit & Mayer, Ltd.

(57) ABSTRACT

The invention relates to a method for producing a non-oxide ceramic powder comprising a nitride, a carbide, a boride or at least one MAX phase with the general composition $M_{n+1}AX_n$, where M=at least one element from the group of transition elements (Sc, Ti, V, Cr, Zr, Nb, Mo, Hf and Ta), A=at least one A group element from the group (Si, Al, Ga, Ge, As, Cd, In, Sn, Tl and Pb), X=carbon (C) and/or nitrogen (N) and/or boron (B), and n=1, 2 or 3. According to the invention, corresponding quantities of elementary starting materials or other precursors are mixed with at least one metal halide salt (NZ), compressed (pellet), and heated for synthesis with a metal halide salt (NZ). The compressed pellet is first enveloped with another metal halide salt, compressed again, arranged in a salt bath and heated therewith until the melting temperature of the salt is exceeded. Optionally, melted silicate can be added, which prevents the salt from evaporating at high temperatures. Advantageously, the method can be carried out in the presence of air.

15 Claims, 3 Drawing Sheets

(52) U.S. Cl.
CPC .... *C04B 35/6261* (2013.01); *C04B 35/62645* (2013.01); *C04B 35/62675* (2013.01); *C04B 2235/3826* (2013.01); *C04B 2235/402* (2013.01); *C04B 2235/444* (2013.01); *C04B 2235/604* (2013.01); *C04B 2235/658* (2013.01); *C04B 2235/6583* (2013.01)

(58) Field of Classification Search
CPC ...... C04B 35/62675; C04B 2235/3826; C04B 2235/402; C04B 2235/444; C04B 2235/604; C04B 2235/658; C04B 2235/6583; C04B 2235/3201; C04B 2235/3203; C04B 2235/404; C04B 2235/425; C04B 2235/428; C04B 2235/445; C04B 2235/5436; C04B 2235/66; C04B 2235/72; C04B 35/58; C04B 35/62655; C04B 35/5607; C04B 35/56; C04B 35/5805; C04B 35/6268; C01B 32/907; C01B 21/0602; C01B 35/04; B01J 2/22; B01J 2/28; B01J 2/30
See application file for complete search history.

(56) References Cited

FOREIGN PATENT DOCUMENTS

| | | |
|---|---|---|
| CN | 1789203 A | 6/2006 |
| CN | 1884064 A | 12/2006 |
| CN | 102191394 A | 9/2011 |
| EP | 2423164 A1 | 2/2012 |

OTHER PUBLICATIONS

Zhang et al (Molten salt synthesis of continuous tungsten carbide coatings on graphite flakes, Ceramics International, 2017) (Year: 2017).*
Yang et al (Molten salt synthesis of Mo2C powder using a mechanically milled powder, Materials Letters, 2007) (Year: 2007).*
Yang, et al. "Molten Salt Synthesis of Mo2C Powder Using a Mechanically Milled Powder," *Materials Letter* 61,26: 4815-4817 (Oct. 1, 2007). XP022230643.
Yang, et al. "Molten Salt Synthesis of Tungsten Carbide Powder Using a Mechanically Activated Powder," *International Journal of Refractory Metals and Hard Materials* 29, 1: 138-140 (Jan. 1, 2011). XP027433984.
Guo, et al. "Preparation of Ti3siC2 Powders by the Molten Salt Method," *Materials Letters* 111, 23: 211-213 (Aug. 23, 2013). XP028728941.
Tian, et al. "Cr2AlC Powders prepared by Molten Salt Method," *Journal of Alloys and Compounds* 461, 1-2: L5-L10 (Aug. 11, 2008). XP022708663.
Jeitschko, et al. "Die Kristallstruktur von Ti3SiC2—ein neuer Komplexcarbid-Typ," *Monatshefte für Chemie* 98, 2: 329-337 (Mar. 1967).
Barsoum, et al. "Synthesis and Characterization of a Remarkable Ceramic: Ti3SiC2," *Journal of the American Chemical Society* 79, 7: 1953-1956 (Jul. 7, 1996).
Goto, et al. "Chemically Vapor Deposited Ti3SiC2" *Materials Research Bulletin* 22, 9: 1195-1201 (Sep. 1987).
Guo, et al. "Cold Sintering: A Paradigm Shift for Processing and Integration of Ceramics," *Angewandte Chemie, International Edition* 55, 38 (Aug. 11, 2016).
Huang Zhong, et al., "Non-oxide ceramic powders synthesized by molten salt method", Refractories, Jun. 30, 2015, pp. 232-237, vol. 49, issue 3, Institute of Refractories Research, China.

* cited by examiner

METHOD FOR PRODUCING NON-OXIDE CERAMIC POWDERS

CROSS_REFERENCE TO PRIOR APPLICATIONS

This application is a U.S. National Phase application under 35 U.S.C. § 371 of International Application No. PCT/DE2018/000178, filed on Jun. 7, 2018, and claims benefit to German Patent Application No. 10 2017 006 658.2, filed on Jul. 13, 2017. The International Application was published in German on Jan. 17, 2019 as WO 2019/011358 A1 under PCT Article 21(2).

FIELD

The invention relates to the production of ceramic powders, in particular to the production of non-oxide ceramic powders comprising nitrides, carbides or borides, and in particular also to the synthesis of MAX-phase powders.

BACKGROUND

It is known that the syntheses of non-oxide materials are always carried out in a protected atmosphere or in a vacuum in order to prevent oxidation of the material in the presence of oxygen. It is thus an inevitable requirement that the processing of non-oxide materials which must be protected from unwanted oxidation be routinely carried out in a protected atmosphere of argon, nitrogen, or in vacuo.

The syntheses of MAX phases are currently also carried out under argon or in vacuo at temperatures up to above 1000° C. A MAX phase is taken to mean a compound of the general formula $M_{n+1}AX_n$, where M=transition element (e.g. Ti, V, Cr, . . . ), A=A-group element (Al, Si, . . . ), X=carbon or nitrogen, and n=1, 2, or 3. By general definition, the MAX phases represent a group of ternary nitrides and carbides. The production of MAX phases is regularly carried out in a sintering step which is generally also referred to as "reactive sintering". However, in such a process step it is not possible to produce the MAX phase as a free powder which would be required for further contouring processes.

The first example of a MAX phase ($Ti_3SiC_2$) was prepared for the first time by Jeitschko and Nowotny where mixed titanium hydride, silicon and graphite were heated in a graphite crucible at 2000 C[1]. However, such high temperatures render a large-scale MAX synthesis unprofitable.

Barsoum et al., for example, used a mixed powder of titanium, carbon and silicon carbide for the production of a MAX phase ($Ti_3SiC_2$), compressing the powder mixture at 1600° C. and thereby providing a uniaxial pressure of 40 MPA[2]. The MAX phase thus produced was completely dense and had a simple shape which also needed to be machined for further contouring. To produce free MAX-phase powder from the dense material using the aforementioned process would thus require an additional milling or grinding process.

Monolithic $Ti_3SiC_2$ has also already been synthesized by the chemical vapor deposition (CVD) method, wherein chloride precursors of titanium, silicon and carbon have been used[3].

The disadvantages of this method for producing MAX phases in general are the low deposition rate and the expensive and often toxic precursors. Moreover, CVD is not suitable for synthesizing powders, but is only suitable for depositing thin films and/or layers on a substrate.

All aforementioned methods describe the production of MAX-phase powders in a protective atmosphere of argon or nitrogen or in vacuo.

Also known is the synthetic route for oxide and carbide ceramic powders via a molten salt. In this process, too, a protective atmosphere or vacuum is always set, which pushes up the cost of such synthesis.

Guo et al. have already produced a $Ti_3SiC_2$ MAX phase via a molten salt of NaCl as flux under protective gas atmosphere (argon)[4].

$Cr_2AlC$ powders have also already been synthesized using molten salt for which a mixture of NaCl and KCl in a ratio of 1:1 was used as flux. The reaction mixture was poured into a quartz tube in vacuo and heat-treated at high temperatures. This process, too, always requires a protective atmosphere or vacuum in order to mediate the reactions at the high temperatures.

From R. Yang et al., "Molten salt synthesis of $Mo_2C$ powder using a mechanically milled powder", Mater. Lett., 61, 2007, 4815-4817, a method for producing $MO_2C$ is known in which an Mo—C powder is mixed with NaCl and KCl and specimens are produced therefrom. These are placed in molten salt and heat-treated at 1000° C. for 60 min.

Furthermore, a method for producing MAX phases is disclosed in X. Guo et al., "Preparation of $Ti_3SiC_2$ powders by the molten salt method", Materials Letters 2013, vol. 111, pp. 211-213. Here, $Ti_3SiC_2$ powder was successfully recovered by the molten salt method using NaCl as flux. Oxygen exclusion was achieved by sintering in an argon atmosphere.

SUMMARY

A method for producing a non-oxide ceramic powder comprising at least one nitride, one carbide, one boride or at least one MAX phase having the general composition $M_{n+1}AX_n$, comprising mixing stoichiometric quantities of elemental starting materials or other precursors comprising the necessary elements for forming the nitride, carbide, boride or at least one MAX phase with at least one metal halide salt to form a mixture; compressing the mixture to form a compressed pellet; encapsulating the compressed pellet with at least one metal halide salt and compressing again to form an encapsulated pellet; and then heating the encapsulated pellet in a metal-halide salt bed; wherein M is at least one element selected from the group consisting of Sc, Ti, V, Cr, Zr, Nb, Mo, Hf and Ta; A is at least one element selected from the group consisting of Si, Al, Ga, Ge, As, Cd, In, Sn, Tl and Pb; X is C, N, B, or any combination thereof; and n is 1, 2, or 3.

BRIEF DESCRIPTION OF THE DRAWINGS

FIG. 1 schematically shows an embodiment of the invention. The pellet (4) comprising the stoichiometric starting powders or precursors and at least one salt is arranged together with the salt-containing encapsulation (3) in a porous salt bed (2) in an aluminum melting crucible (1). During the heating process, the porous metal-halide salt bed (2) and the encapsulation (3) of the pellet (4) melt.

Differential scanning calorimetry (DSC) and thermogravimetric analyses were carried out for the $Ti_3SiC_2$ system with KBr as the metal halide salt (FIGS. 4a and 4b) which illustrate the shielding effect of the metal halide salt KBr during synthesis in the presence of air.

DETAILED DESCRIPTION

Certain embodiments of the invention provide an alternative synthetic route for the production of non-oxide ceramic powders, and in particular of MAX-phase powders, that are significantly more cost-effective than the previous methods and is also easier to handle.

In the context of the invention it has been found that when producing non-oxide ceramic powders, it is possible to dispense with the previously customary protective atmosphere or the use in vacuo without the non-oxide material undergoing oxidation.

The invention relates to the production (synthesis) of non-oxide ceramic powders comprising nitrides, carbides or borides, and including the production of ceramic powders comprising so-called MAX phases. In certain embodiments of the invention, the elemental starting materials or other precursors as powders that have the necessary elements for forming the non-oxide ceramic material are mixed with at least one metal halide salt and heated in the presence of air or oxygen together with at least one metal halide salt to above its melting point so that the powder to be synthesized is arranged in molten salt (melt pool) which effectively prevents any supply of oxygen to the non-oxide ceramic powders. The typical synthesis temperatures for MAX phases are between 800 and 1400° C.

For this purpose, the elemental starting materials or other precursors can be preferably dispersed as powders in a non-reactive organic solvent or in water or even dry-mixed.

The admixed metal halide salt forms molten salt at higher temperatures above its melting temperature and thereby functions as a medium in which, on the one hand, the individual atoms of the starting materials or precursors can easily diffuse and which, on the other hand, serves as protection from the oxygen present. To this end, without wishing to be bound to any particular theory, the molten salt forms an impermeable melt pool having a solubility for oxygen which hardly differs from zero. This effectively prevents dissolution of the oxygen from the oxygen-containing atmosphere present in the melt pool. In this respect, the molten salt functions as a kind of oxidation barrier between the non-oxide ceramic powders susceptible to oxidation and the oxygen-containing atmosphere surrounding them.

Certain embodiments of methods according to the invention is particularly suitable for the production (synthesis) of powders comprising at least one MAX phase. A MAX phase has the general composition $M_{n+1}AX_n$, wherein M=at least one element from the group of transition elements (Sc, Ti, V, Cr, Zr, Nb, Mo, Hf and Ta), A=at least one A-group element from the group (Si, Al, Ga, Ge, As, Cd, In, Sn, Tl and Pb), X=carbon (C) and/or nitrogen (N) and/or boron (B), and n=1, 2, or 3. The A, M and X positions can be occupied by more than one element in each case.

It is pointed out that in the context of this invention the collective designation "MAX phase" is also intended to include borides in addition to carbides and nitrides. Although not having the same crystal structures as the MAX phases known from the prior art they are nevertheless regularly present as $M_2AB_2$ or MAB in layers, and they do however have some common properties with the known MAX phases due to their nanolaminated structure and are therefore subsumed under this term in the present invention.

Although, according to the invention, the synthesis of at least one non-oxide ceramic powder, for example of one MAX phase, i.e. also of more than one MAX phase, is simultaneously possible in one method step, for the sake of simplicity embodiments of the inventive method for producing non-oxide ceramic powders are disclosed hereinafter in the application on the basis of the example of one MAX-phase powder without this being implying any limitation of the method disclosed.

Certain embodiments of methods according to the invention comprise the step of synthesizing a MAX phase by heating the corresponding pulverulent starting materials in the form of the pure elements or other precursors in a metal halide salt (NZ), with N=at least one element from the group (Li, Na, K, Ru, Cs, Mg, Be, Ca, Sr, Ba) and Z=at least one element from the group (F, Cl, Br, I), or in a mixture of corresponding metal halide salts.

Embodiments of the method can be advantageously carried out in the presence of air or of an oxygen-containing atmosphere, so that it is advantageously possible to dispense with a protective gas atmosphere or the use of vacuum.

The synthesis of the MAX-phase powder is here supported by the molten salt. The effect of the molten salt is such that it prevents, on the one hand, oxidation of the non-oxide ceramic material and thereby both oxidation of the pulverulent starting materials and of the synthesized MAX phase during the high-temperature treatment (synthesis) and can also as flux advantageously lower the synthesis temperature. The salt or molten salt used can have both a single salt or a salt mixture which advantageously results in an adaptation of the process parameters to the synthesis of the corresponding MAX-phase powders. It is already known that the addition of dopants can lead to an improvement in the synthesis. The dopants that may be used include, for example, aluminum with a proportion of not more than 25% by weight in relation to the non-oxide powder.

Certain embodiments of methods according to the invention make it superfluous, in particular, to use expensive furnaces operated under inert gas or use in vacuo, and thereby regularly reduces production costs. Certain embodiments thus advantageously provide a method for producing non-oxide ceramic powders, in particular MAX-phase powders, even on a large scale.

Embodiments of the method of the invention are described in more detail below.

According to certain embodiments of the invention, stoichiometric amounts (mol) of pulverulent starting materials comprising M, A and X as pure elemental powders or corresponding precursors are mixed together with at least one metal halide salt, with chlorides or bromides of sodium or potassium being particularly advantageous as metal halide salt due to their low melting points and great solubility in water.

A very wide range from, for example, 20:1 to 1:100 can be selected for the mass-based mixing ratio of starting powder to metal halide salt. However, in order for the admixed salt to be able to fulfill its function as flux for improving the diffusion of the starting powders, a proportion of at least 5% by weight, more preferably 10% by weight is advantageous.

The mixture is then mixed to ensure a uniform distribution of starting powders and salt. Mixing can be effected, for example, by shaking or by stirring with a magnetic stirrer. Milling in a ball mill is also a suitable method for mixing the components.

The mixing of starting powders and salt can moreover be carried out dry or also by adding a non-reactive organic solvent and/or also water.

The particle sizes of the starting powders play only a minor role in the synthesis and can be therefore advantageously selected from a very wide range, for example from nanopowders to powders having particles in the millimeter range. However, it has been found to be particularly advantageous to use powder with particle sizes in the μm range.

The mixture is then dried, where appropriate, and solidified to form a green body (pellet), wherein firstly a uniaxial pressure is exerted unilaterally at moderate low temperatures up to a maximum of 200° C., but preferably at room temperature, and then followed by cold isostatic pressing. Compressing is regularly carried out at pressures between 10 MPA and 1000 MPA, advantageously between 50 MPA and 500 MPA.

The admixed salt assists in compacting the green body and thus supports the density of the green body produced.

In a further step, the green body is encapsulated in a metal halide salt, for example by uniaxial compression or isostatic pressing of the already pressed pellets in a press mold having a larger diameter than that of the pellets already pressed. The metal halide salt used for this purpose may be identical to the salt already used in the pellets. This is not however mandatory.

The complete envelopment (encapsulation) of the solidified ceramic powder material with metal halide salt advantageously results in a barrier being created between the oxygen-containing atmosphere present and the reactive components of the powder mixture of the green body. In particular, the high density of the pressed salt of the encapsulation is responsible for the sealing (e.g., hermetic) of the encapsulation of the reactive mixture.

The compressed salt in the encapsulation regularly has a theoretical density of more than 90%, advantageously even more than 95%. Although the compressed salt still has individual pores, these are not continuous so that all in all, in embodiments of the invention, there is a hermetic, gastight seal with respect to the pellet embedded therein.

In this respect, KBr has been found to be a particularly suitable metal halide salt for an encapsulation since it can be compressed very well up to the theoretical density even at room temperature and thus represents a very good hermetic seal for the green body contained therein. Furthermore, even when some water was added, NaCl could also be pressed very well, i.e. almost gastight, around a pellet at room temperature.

Halogen salts can be compacted to green-body densities greater than 95% of their theoretical density. This phenomenon is based on the ductility of halogen salts under certain pressure conditions at room temperature. The green body has a low porosity, but at this porosity the pores are closed so that the encasement is to be regarded as gastight within the context of this invention.

Permeability measurements with helium/air on KBr tablets yielded permeability values of $1.4 \cdot 10^4$ hPa·dm$^3$·s$^{-1}$ which can be regarded as gastight within the context of the present invention.

An embodiment of the invention provides for the salt-encapsulated pellet (green body) to be then arranged in a suitable container, for example a crucible, in a bed of metal halide salt (salt bed). The metal halide salt used for this purpose may be, in turn, identical to the metal halide salt already used in the pellets and/or for the encapsulation. This is not however mandatory.

In the context of this invention, the arrangement in a metal-halide salt bed means that the pellet is completely surrounded by this metal halide salt. The metal-halide salt bed initially has a certain porosity which is lost only upon complete melting.

The crucible with the salt bath and the pellet embedded therein and encapsulated in salt are heated together. This can take place, for example, in an oven with resistance heating. Preferably, no additional pressure is applied in this heating step. Heating takes place up to at least 300° C. or up to the melting temperature of the metal halide salt used. If a plurality of different metal halide salts have been used, heating takes place to at least the temperature at which the salt mixture melts and forms a liquid salt melt. Although the synthesis of the non-oxide ceramic powder takes place even at lower temperatures, higher temperatures are to be selected in the individual case in order to achieve a good yield. However, a maximum temperature of 1400° C. should not be exceeded generally (but see further discussion below) since otherwise there is a risk that the metal halide salt used or a metal halide salt mixture used will evaporate to a not inconsiderable degree.

The metal-halide salt melt also functions as a medium which serves as protection from the oxygen present. To this end, the molten salt forms an impermeable melt pool having a solubility for oxygen which scarcely differs from zero. This effectively prevents dissolution of the oxygen from the oxygen-containing atmosphere present in the melt pool. In this respect, the molten salt functions as a kind of oxidation barrier between the non-oxide ceramic powders susceptible to oxidation and the oxygen-containing atmosphere surrounding them.

Advantageously, unlike in the prior art no particular inert atmosphere has to be set in this method step. The method can thus also be carried out in air.

In certain embodiments of the invention, in this method step, the hermetic encapsulation of the pellet serves in particular for sealing the pellet off from oxygen which could otherwise lead to undesired oxidation of the reactive starting powders in the initially porous metal-halide salt fill during the heating process up to the melting of the salt or up to the desired maximum synthesis temperature.

After the heating step, the crucible is cooled again and the contents (synthesized MAX phase in a salt bed) are placed in a liquid, preferably in a water bath, with the salt dissolving in the liquid and the pellet remaining with the synthesized non-oxide ceramic MAX-phase powder. Optionally, the liquid, in particular the water, may be heated to improve the solubility of the salt. Aqueous solutions or short-chain alcohols are also suitable liquids alongside pure water. In this process step, both the salt from the salt bath and the salt that was compressed again together with the already pressed pellet dissolve completely in the liquid such that the synthesized, non-oxide ceramic MAX-phase powder can be removed. Furthermore, this also removes the salt which was initially mixed together with the starting powders/precursors so that only the pure non-oxide ceramic phase, in particular at least one MAX-phase compound, is present.

In a further advantageous embodiment of the invention, a crucible with at least one metal halide salt with a pellet encapsulated in the salt is first heated up to above the melting point of the salt bath in a manner analogous to a previously described embodiment.

Here, too, the temperature of the metal-halide salt bath can be subsequently further increased as in the aforementioned embodiment, for example to over 800° C. Heating to temperatures above 1400° C. should be avoided, however, except under certain conditions described below.

Parallel to this method step, at least one silicate, preferably a sodium, potassium or lithium silicate ($Na_2SiO_3$, $K_2SiO_3$ or $Li_2SiO_3$) may be optionally also heated in a further crucible. Advantageously, this step is carried out in the same furnace in which the metal-halide salt melt bath is heated with the green body so that the molten silicate and the molten salt with the pellet have the same temperature.

At a temperature above the melting point of the silicate used, i.e., for example, around 1100° C. for sodium silicate with a melting point $T_m$=1088° C., the molten silicate is carefully applied to the surface of the salt bath with the pellet, in the simplest case poured. Due to the difference in density between the molten metal-halide salt of the salt bath and the molten silicate and due to their mutual insolubility, the molten silicate floats on top of the molten salt. The floating silicate thus advantageously prevents undesired evaporation of the molten salt from the salt bath. In this way the temperature for the synthesis can be even increased to over 1400° C. up to a maximum of 1600° C., if necessary, without any significant loss of salt from the salt bath.

In certain embodiments, this is followed by cooling and dissolution of both the metal halide salt and preferably the silicate used in a liquid in a manner analogous to the first embodiments. The pellet thus obtained now only has the desired synthesized, non-oxide ceramic powder.

Depending on the composition of the mixture of the starting powders and the maximum temperature set, a more or less pure powder of the desired composition is obtained as the main phase. Unreacted starting powders and dopants are optionally obtained as secondary phases. The purity of the desired powder can be improved in that, at the beginning, correspondingly stoichiometric amounts of the corresponding starting powders or precursors are used and the temperature is set sufficiently high according to the composition in the metal-halide salt bath.

It is again pointed out that certain embodiments according to the invention (synthesis) describe the preparation of a non-oxide ceramic powder from the corresponding starting materials or precursors and in this respect does not comprise a sintering step.

The present invention advantageously prevents high costs which arise for the hitherto necessary complex monitoring of the furnace atmospheres and thus enables a cost-effective large-scale production variant for non-oxide ceramic powders, in particular powders comprising at least one MAX phase, or even for simple carbides. These can then be advantageously used for the production of components, in particular of a further contouring, compacting or consolidation.

EXAMPLES

The invention is explained in more detail below with reference to several exemplary embodiments, without this limiting the broad scope of protection.

To produce a non-oxide ceramic powder comprising at least one MAX phase according to the invention, stoichiometric quantities/masses of elemental starting materials or corresponding precursors which form the necessary elements for forming the non-oxide ceramic material are mixed with at least one metal halide salt and heated in each case in the presence of air or oxygen to temperatures up to above the melting temperature of the metal halide salt.

1st Example

In the present case, Ti (99.9% pure, −325 mesh), Si (99.9% pure, −325 mesh) and graphite (99.9% pure) were mixed with NaCl to prepare $Ti_3SiC_2$ powder, whereby the mass ratio of Ti/Si/C was set to 3:1:2. The mass ratio of Ti+Si+C to NaCl was 1:1.

In addition, to improve the purity of the final product, pure aluminum (99.9% pure, −325 mesh, corresponding to approx. 40 μm) was added as doping. The proportion of aluminum in the end product was varied between 0.01 and 0.3 mol %.

The powders were mixed wet, or more specifically ground, i.e. in ethanol, and with the aid of zirconium balls having a diameter of 5 mm for 24 hours. The slurry mixture was first predried in a rotary evaporator at 60° C. and then dried in an oven at 70° C. for another 24 hours.

The dried powder was uniaxially compressed at 200 MPa (pellets) and then encapsulated in NaCl. To this end, the pellets were placed in a NaCl-filled crucible having a diameter larger than the pellets, were covered with NaCl and then again compressed at 200 MPa. The pellets thus encapsulated in NaC were additionally cold-isostatically pressed at a pressure of 300 MPa.

The pellets were then embedded in a bed of NaCl and heated in a crucible in the presence of air up to temperatures of approx. 1200° C. and held at this temperature for one hour. The melting point of pure NaCl is 801° C. After cooling, the salt was washed off with water to thus obtain the pellet with the reactive powder mixture.

The powder mixture was characterized by X-ray diffraction. $Ti_3SiC_2$ was identified as the main phase having a purity of nearly 100%, whereby the aluminum doping was not taken into consideration. $TiSi_2$ and TiC were identified as secondary phases.

2nd Example

In this case, Ti (99.9% pure, −325 mesh), Al (99.9% pure, −325 mesh) and graphite (99.99% pure) were mixed with KBr to prepare $Ti_3AlC_2$ powder, whereby the mol ratio of Ti/Al/C was set to 3:1:2. The mass ratio of Ti+Al+C to NaCl was 1:1.

The powders were mixed wet, i.e. in ethanol, and with the aid of zirconium balls having a diameter of 5 mm for 24 hours. The slurry mixture was first predried in a rotary evaporator at 60° C. and then dried in an oven at 70° C. for another 24 hours.

The dried powder was uniaxially compressed at 200 MPa (pellets) and then encapsulated in KBr. To this end, the pellets were placed in a KBr-filled crucible having a diameter larger than the pellets, covered with KBr and then again compressed at 200 MPa. The pellets thus encapsulated in KBr were additionally cold-isostatically pressed at a pressure of 300 MPa.

The pellets were then embedded in a bed of KBr and heated in a crucible in the presence of air up to temperatures of approx. 1250° C. and held at this temperature for one hour. The melting point of pure KBr is 734° C. After cooling, the KBr salt was washed off with water to obtain the pellet with the reactive powder mixture.

The powder mixture was also characterized by X-ray diffraction. $Ti_3AlC_2$ was identified as the main phase having a purity of more than 98%. TiC was identified as the secondary phase.

3rd Example

In this case, Cr (99.9% pure, −60 mesh), Al (99.9% pure, −325 mesh) and graphite (99.99% pure) were mixed with KBr to prepare $Cr_2AlC$ powder, whereby the mol ratio of Cr/Al/C was set to 2:1:1. The mass ratio of Cr+Al+C to NaCl was 1:1.

The powders were mixed wet, i.e. in ethanol, and with the aid of zirconium balls having a diameter of 5 mm for 24 hours. The slurry mixture was first predried in a rotary evaporator at 60° C. and then dried in an oven at 70° C. for another 24 hours.

The dried powder was uniaxially compressed at 200 MPa (pellets) and then encapsulated in KBr. To this end, the pellets were placed in a KBr-filled crucible having a diameter larger than the pellets, covered with KBr and then again compressed at 200 MPa. The pellets thus encapsulated in KBr were additionally cold-isostatically pressed at a pressure of 300 MPa.

The pellets were then embedded in a bed of KBr and heated in an aluminum crucible in the presence of air up to temperatures of approx. 1250° C. and held at this temperature for one hour. After cooling, the KBr salt was washed off with water to obtain the pellet with the reactive powder mixture.

The powder mixture was also characterized by X-ray diffraction. $Cr_2AlC$ was identified as the main phase having a purity of more than 98%. $Cr_7C_3$ was identified as the secondary phase.

4th Example

In the present case, as an example of the preparation of a non-typical MAX-phase powder but rather for a carbide powder, Ti (99.9% pure, −325 mesh) and graphite (99% pure) were mixed with KBr, whereby the mol ratio of Ti/C was set to 1:1. The mass ratio of Ti+C to KBr was also 1:1.

The powders were mixed wet, i.e. in ethanol, and with the aid of zirconium balls having a diameter of 5 mm for 24 hours. The slurry mixture was first predried in a rotary evaporator at 60° C. and then dried in an oven at 70° C. for another 24 hours.

The dried powder was uniaxially compressed at 200 MPa in the form of cylinders (pellets) and then encapsulated in KBr. To this end, the pellets were placed in a KBr-filled crucible having a diameter larger than the pellets, covered with KBr and then again compressed at 200 MPa. The pellets thus encapsulated in KBr were additionally cold-isostatically pressed at a pressure of 300 MPa.

The pellets were then embedded in a bed of KBr and heated in an aluminum crucible in the presence of air up to temperatures of approx. 1200° C. and held at this temperature for one hour. After cooling, the KBr salt was washed off with boiling water to obtain the pellet with the reactive powder mixture.

The powder mixture was also characterized by X-ray diffraction. TiC was identified as the only phase.

In addition to the encapsulations in KBr presented so far, which proved to be particularly suitable, it is also possible to encapsulate the previously produced pellets in NaCl. Unlike KBr, NaCl cannot be densified more than up to about 95% of the theoretical density by pure pressing. In the presence of a supersaturated solution of the corresponding salt—in other words NaCl also—the NaCl-encapsulated pellets can be kept for 24 hours at a relative humidity of 75% to 85%. Here, a sintering effect will occur within the salt which will result in the pores that are still open up to this point being closed in the compressed salt encapsulation[5].

Although this method step is very time-consuming, it can nevertheless lead to an overall reduction in the production costs given the corresponding scaling.

Figure 1:
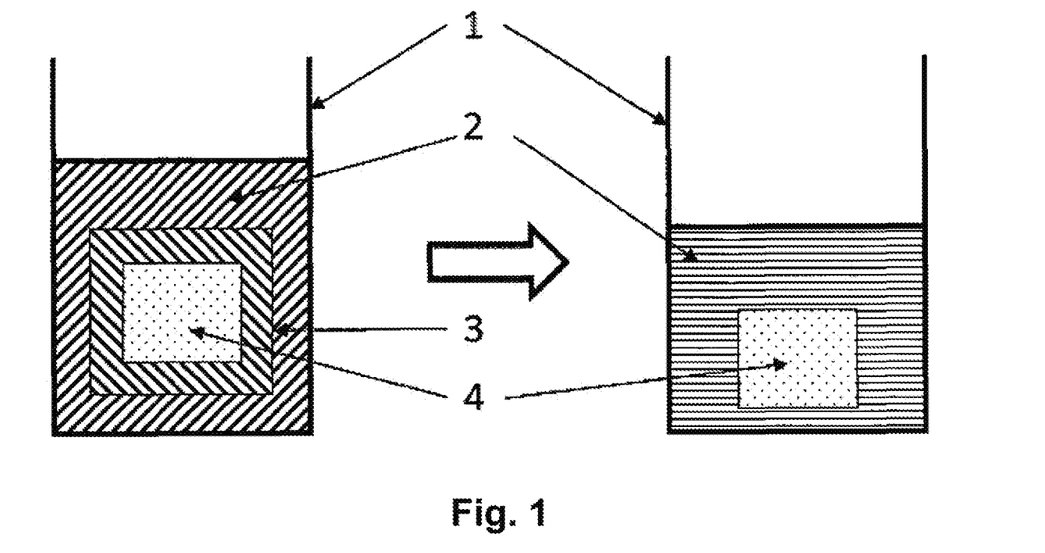

FIG. 1 schematically shows an embodiment of the invention. The pellet (4) comprising the stoichiometric starting powders or precursors and at least one salt is arranged together with the salt-containing encapsulation (3) in a porous salt bed (2) in an aluminum melting crucible (1). During the heating process, the porous metal-halide salt bed (2) and the encapsulation (3) of the pellet (4) melt. The salt present in the compressed pellet also melts and then functions as a flux for better diffusion of the starting powders. The volume of the salt bed decreases. The amount of salt in the metal-halide salt bed is such that even after the melting of the salt, the pellet is still completely surrounded by metal halide salt so that a supply of oxygen from the surrounding air to the pellet can be ruled out.

Figure 2:
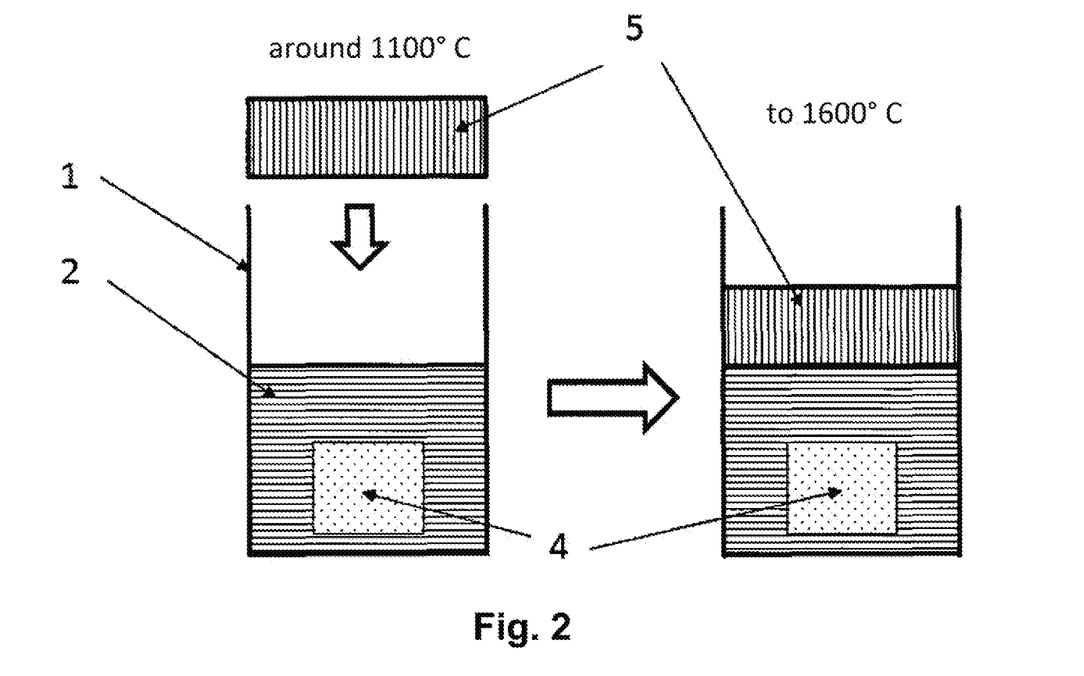
FIG. 2 shows a further embodiment of the inventive method where, first, the pellet (4) comprising the stoichiometric starting powders or precursors and at least one metal halide salt together with the salt-containing encapsulation (3) is arranged in a porous metal-halide salt bed (2) in an aluminum melting crucible (1) according to FIG. 1 and is heated together up to temperatures above the melting temperature of the salt (2) and further up to temperatures above the melting temperature of the silicate (5) used. The likewise melted silicate (5) is added to the molten salt, wherein a stratification in which the molten silicate floats on top of the molten salt is produced due to the difference in density.

FIG. 2 shows a further embodiment of the inventive method where, first, the pellet (4) comprising the stoichiometric starting powders or precursors and at least one metal halide salt together with the salt-containing encapsulation (3) is arranged in a porous metal-halide salt bed (2) in an aluminum melting crucible (1) according to FIG. 1 and is heated together up to temperatures above the melting temperature of the salt (2) and further up to temperatures above the melting temperature of the silicate (5) used. The likewise melted silicate (5) is added to the molten salt, wherein a stratification in which the molten silicate floats on top of the molten salt is advantageously produced due to the difference in density. In this way disadvantageous evaporation of the metal halide salt can be prevented even at higher temperatures up to 1600° C.

KBr is an alkali metal-halide salt that is highly ductile at room temperature. It was possible to show that potassium salts (KCl) can be reshaped by hand. The measurement of the density and gas permeability on a 4-mm thick KBr disk which is cold-pressed at room temperature shows that the encapsulation of KBr acts as a barrier between the atmosphere and the sample in the pre-salt melt. The disk was pressed uniaxially at 200 MPa and then isostatically below 300 MPa. The geometric density was 98% of the theoretical value. The KBr disk was placed on a sealing ring with an external force applied to secure it. A helium/air mixture was passed through the KBr disk and the helium/air effluent was measured on the other side of the disk. The permeability values of helium and air through the KBr disk are $1.4 \cdot 10^4$ $hPa \cdot dm^3 \cdot s^{-1}$ which indicates that the encapsulation of the sample by KBr is gastight.

Figure 3:
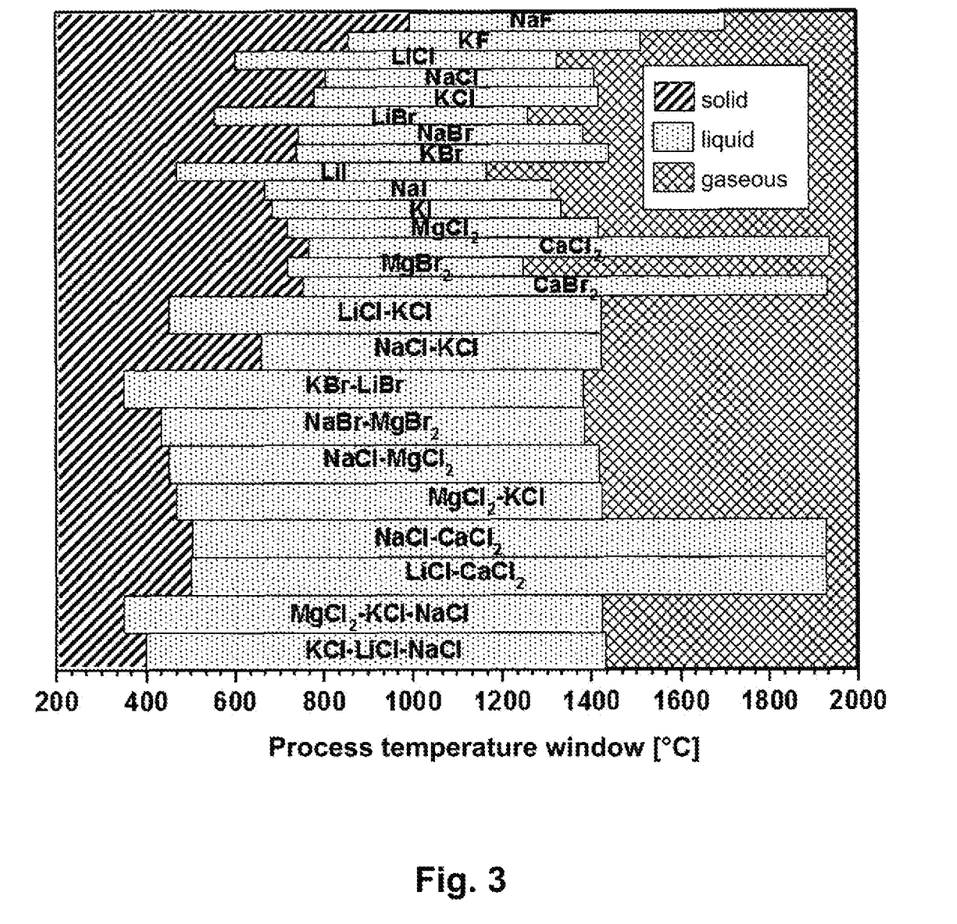
In FIG. 3, the conditions for the solid, liquid, and gaseous phases are shown as a function of the temperature for various metal halide salts which thus enable selection with regard to suitable process windows for the synthesis according to the invention.

In FIG. 3, the conditions for the solid, liquid, and gaseous phases are shown as a function of the temperature for various metal halide salts which thus enable selection with regard to suitable process windows for the synthesis according to the invention.

Figure 4A:
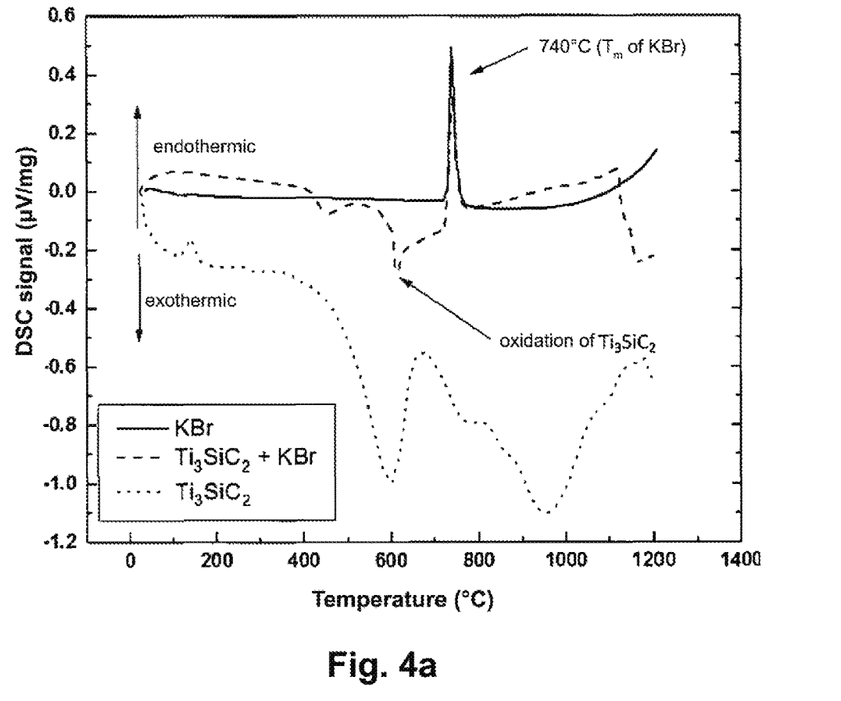
Figure 4B:
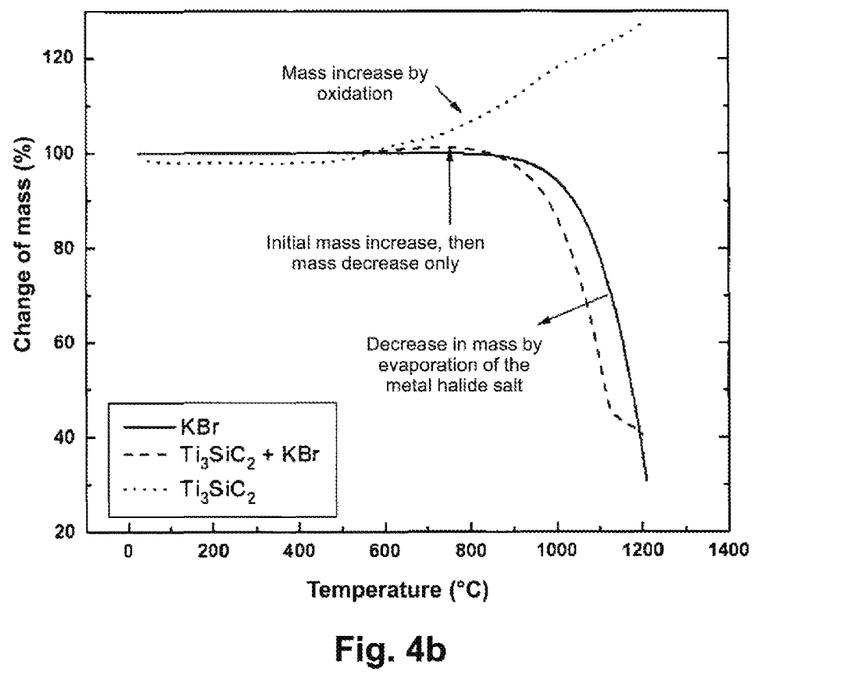

Moreover, differential scanning calorimetry (DSC) and thermogravimetric analyses were carried out for the $Ti_3SiC_2$ system with KBr as the metal halide salt (FIGS. 4a and 4b) which illustrate the shielding effect of the metal halide salt KBr during synthesis in the presence of air.

Thermal analysis (DSC) was carried out in air on samples with and without KBr encapsulation (FIG. 4a) to confirm the prevention of oxidation due to the gastight effect of the KBr encapsulation. The samples without encapsulation show a strong oxidation and a significant increase in mass, while the additionally encapsulated specimens show only minor oxidation. Oxidation is significantly lower with encapsulation and ends once the melting point of KBr has been reached.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LITERATURE CITED IN THIS APPLICATION

[1] W. Jeitschko, H. Nowotny, Die Kristallstruktur von $Ti_3SiC_2$-ein neuer Komplexcarbid-Typ, Monatshefte fur Chemie—Chemical Monthly, March 1967, Volume 98, Issue 2, pages 329-337.
[2] Michael W. Barsoum, Tamnr el-Raghy, Synthesis and Characterization of a Remarkable Ceramic: $Ti_3SiC_2$, Journal of the American Chemical Society, Volume 79, Issue 7, July 1996, pages 1953-1956.
[3] T. Goto, T. Hirai, Chemically vapor deposited $Ti_3SiC_2$, Materials Research Bulletin, Volume 22, Issue 9, September 1987, pages 1195-1201.
[4] Xue Guo, Junxia Wang, Shiyuan Yang, Long Gao, Bin Qian, Preparation of $Ti_3SiC_2$ powders by the molten salt method, Materials Letters, Volume 111, 15 Nov. 2013, pages 211-213.
[5] Jing Guo, Hanzheng Guo, Amanda L. Baker, Michael T. Lanagan, Elizabeth R. Kupp, Gary L. Messing, and Clive A. Randall, Cold Sintering: A Paradigm Shift for Processing and Integration of Ceramics, Angewandte Chemie, International Edition, Volume 55, Issue 38, Version of Record on-line: 11 Aug. 2016.

The invention claimed is:

1. A method for producing a non-oxide ceramic powder comprising at least one nitride, one carbide, one boride or at least one MAX phase having the general composition $M_{n+1}AX_n$, comprising mixing stoichiometric quantities of elemental starting materials or other precursors comprising the necessary elements for forming the nitride, carbide, boride or at least one MAX phase with at least one metal halide salt to form a mixture;
compressing the mixture to form a compressed pellet
encapsulating the compressed pellet with at least one metal halide salt and compressing again to form an encapsulated pellet and then
heating the encapsulated pellet in a metal-halide salt bed;
wherein M=is at least one element selected from the group consisting of Sc, Ti, V, Cr, Zr, —Nb, Mo, Hf and Ta;
A=is at least one element selected from the group consisting of Si, Al, Ga, Ge, As, Cd, In, Sn, —Tl and Pb;
X is=C, N, B, or any combination thereof; and
n is=1, 2, or 3.

2. The method according to claim 1, wherein the mixing of the starting materials or other precursors with the at least one metal halide salt takes place either in a non-reactive solvent or dry.

3. The method according to claim 1, wherein the mixing takes place in a ball mill.

4. The method according to claim 1, where the heating takes place at least up to a temperature which is above the melting temperature of the at least one metal halide salt used.

5. The method according to claim 1, wherein the at least one metal halide salt comprises NZ, wherein N is=at least one element selected from the group consisting of Li, Na, K, Rb, Cs, Mg, Be, Ca, and Ba, and Z=is at least one element selected from the group consisting of F, Cl, Br, and I.

6. The method according to claim 1, wherein the mixture comprising the elemental starting materials or other precursors and at least one metal halide salt is first compressed into the compressed pellet as a dry mixture.

7. The method according to claim 6, wherein the mixture is first uniaxially and then cold-isostatically pressed to form a pellet.

8. The method according to claim 1, wherein a pressure between 10 MPA and 1000 MPA, is applied during the first compressing step.

9. The method according to claim 1, wherein a pressure between 10 MPA and 1000 MPA, is applied during the second compressing step.

10. The method according to claim 1, wherein the encapsulated pellet is arranged in the metal-halide salt bed and is heated to temperatures above the melting temperature of the metal halide salt.

11. The method according to claim 1, wherein the heating of the encapsulated pellet in the metal-halide salt bed takes place in the presence of oxygen.

12. The method according to claim 10, wherein a molten metal-halide salt bed is produced and wherein the molten metal-halide salt bed comprises a molten silicate which floats as a layer on top of the molten metal-halide salt bed.

13. The method according to claim 12, where the molten metal-halide salt bed and the molten silicate are heated to the same temperature before the molten silicate is added to the molten metal-halide salt bed.

14. The method according to claim 1, further comprising cooling the encapsulated pellet in a metal-halide salt bed after the heating step, and subsequently dissolving the metal halide salt in a liquid.

15. The method according to the preceding claim 14, wherein the metal halide salt is dissolved in water, an aqueous solution, or a short-chain alcohol.

\* \* \* \* \*